Dec. 30, 1969 WOO F. CHOW 3,487,380
NONDESTRUCTIVE TRANSFER, PLATED WIRE MEMORY ARRANGEMENT
Filed June 25, 1965
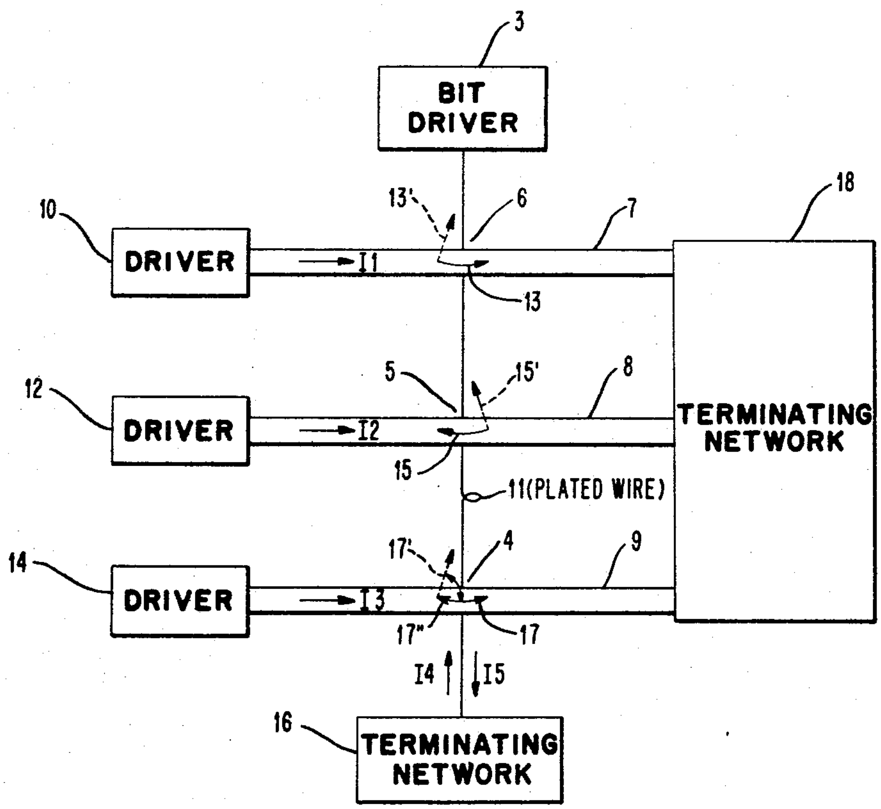
INVENTOR
WOO F. CHOW
BY Rene A. Kuypers
ATTORNEY United States Patent Office 3,487,380
Patented Dec. 30, 1969

3,487,380
NONDESTRUCTIVE TRANSFER, PLATED WIRE MEMORY ARRANGEMENT

Woo F. Chow, Horsham, Pa., assignor to Sperry Rand Corporation, New York, N.Y., a corporation of Delaware Filed June 25, 1965, Ser. No. 466,904
Int. Cl. G11b *5/00*
U.S. Cl. 340—174 8 Claims

ABSTRACT OF THE DISCLOSURE

Information is transferred from a second location to a first location along a plated magnetizable wire non-destructively. This is accomplished by conditioning the first bit location so that it is ready to be switched. The second bit location is then non-destructively interrogated so that a steering signal is generated. This steering current causes the first bit to be completely switched so as to have the same information recorded thereat as the second bit location.

This invention relates in general to a memory device. In particular, this invention relates to a plated wire memory arrangement which enables information to be transferred from one bit location to another bit location along a plated wire.

It is sometimes useful to transfer information from one bit location to another bit location within a memory plane without utilizing apparatus outside of the memory, such as a register or an amplifier. This has not been readily feasible with other known memory devices, such as planar, thin film elements, since insufficient power is generated during the switching of a first thin film bit to readily enable a second thin film bit to be switched from a first stable remanent state to a second stable remanent state. Similarly, substantial power must be developed to switch a core element from one stable remanent state to another and consequently, if this is to be accomplished, a larger core element is required to switch a smaller core.

Accordingly, it is an object of this invention to provide a new and improved memory device which enables information at one location of a data storage element to be readily transferred to an adjacent location of the same data storage element.

It is also another object of this invention to provide a plated wire memory device which enables information stored at one bit location along a plated wire to be transferred to another bit location along the same plated wire without destroying the information in the first mentioned location.

It is yet another object of this invention to provide a memory device wherein the read out phenomenon of a single bit location to be stored in a temporary register.

It is still another object of this invention to provide a memory device wherein the read out phenomenon of a particular memory location provides the power to cause the information stored in another memory location to be switched if necessary from a first to a second stable remanent state.

It is a further object of this invention to provide a plated wire memory device wherein the current produced by the read-out of information located at a bit position along the plated wire is sufficient to provide the power to write new information at a second location along the plated wire.

It is likewise an object of this invention to transfer information from a first memory location to a second memory location entirely within the memory plane.

It is another object of this invention to transfer information from a first location to a second location via a low impedance transfer loop.

In accordance with the features of this invention, a plated wire with memory device is provided wherein binary information is recorded along its length. The nature of this information is such that a binary "zero" or a binary "one" is determined by the orientation of the magnetization vectors around the circumference of the wire (i.e., around the easy axis) at a particular bit location. Accordingly, as an example, if the bit position has its magnetization vectors oriented clockwise (as viewed from the lower end of the wire), it may indicate that a binary "zero" is stored at that location whereas, if the magnetization vectors are oriented in a counterclockwise direction, it will indicate that a binary "one" is recorded therein. To transfer the information stored in a first bit location along the plated wire to a second bit position along the plated wire, the second bit position is first prepared to receive the information from the first bit position by energizing the second juxtaposed and orthogonally arranged drive strap in response to an electrical signal from a driver circuit. By energizing the drive strap of the first bit location along the plated wire, the magnetization vectors which may be assumed to be in a clockwise direction (i.e., a binary zero), are rotated to some angle less than 90 degrees from the easy axis. After the induced signal in the plated wire caused by this rotation has died down, the second bit location now has transferred to it the information which is stored in the first bit location along the plated wire. This occurs since the first bit location has generated the power to change the remanent state of the second bit position. In other words, if the information stored in the first bit location is a binary "zero" and the information stored in the second bit location is a binary "one," the "one" will be switched to a "zero." If the information stored in the first bit location is a "one" and the information stored in the second bit location is a "zero," the "zero" will be switched to a "one." Furthermore, if, for example, the information in the first bit location is a "zero" and the second bit location already has a "zero" recorded thereat, no switching will take place so that the information stored in the first bit is effectively transferred.

The above information transfer is accomplished generally as follows. The first bit location is read-out by energizing its associated drive strap. The magnetization vectors located at this bit position are rotated to an angle less than 90 degrees from the easy axis. A voltage is induced by this rotation which will cause a current to flow in the plated wire. In the event that the first bit is a "one" and the second bit is a "zero," current will be of such a polarity so that the magnetization vectors at the second bit position (which had been previously partially rotated by energizing its drive strap), will be steered to a new direction along the easy axis and therefore will become a "one." Hence, the second bit position will be completely switched from a first stable remanent state to a second stable remanent state. In like manner, the read-out current from a "zero" at a first bit position will supply the proper magnetization force to cause a "one" at a second bit position to be switched to a "zero."

The novel features that are considered characteristic of this inventin are set forth with particularity in the appended claims. The invention itself, however, both as to its organization and method of operation, as well as additional objects and advantages thereof, will best be understood from the following description and considered in conjunction with the accompanying drawings wherein:

FIGURE 1 depicts the organization of the memory device as employed in this invention which provides bit or information transfer.

Referring now to the figure, a plated wire memory element 11 is shown vertically arranged. One end of the plated wire 11 is shown connected to the terminating network 16 whereas the other end is connected to the bit driver 3. The terminating network 16 may represent a ground bus and hence, a complete circuit is provided back to the bit driver 3 which is also grounded. In a preferred embodiment, the plated wire 11 consists of a five mil diameter beryllium copper wire substrate having a thin magnetic film formed on the surface thereof. The thin magnetic film is electroplated on the wire substrate with approximately a 10,000 angstrom thickness of Permalloy (i.e., nickel-iron alloy). The Permalloy film has the approximate ratio of 80% nickel and 20% iron. The Permalloy film is electroplated in the presence of a circumferential magnetic field that establishes a uniaxial anisotropy axis at right angles (i.e., around the circumference) to the longitudinal axis of the wire along its length. The uniaxial anisotropy establishes easy and hard directions of magnetization and the magnetization vectors of its thin film are normally oriented in one of two equilibrium positions along the easy axis, thereby establishing the two bistable states necessary for binary logic operation. In other words, at any location along a plated wire 11, the bit position (i.e., memory element) has two states of stable magnetic remanence, and is adapted to be switched into either of said two states as will be explained in greater detail hereinafter.

Placed substantially perpendicular and in juxtaposition to the plated wire 11, are three drive lines or drive straps 7, 8 and 9. The intersection of the plated wire 11 and the drive lines 7, 8 and 9 comprise various bit positions of the memory. The particular orientation of the magnetization vectors 13, 15 and 17, about the easy axis, represent the binary state (i.e., a binary "zero" or "one") at each of the above mentioned bit positions.

It should be noted that it is not necessary that the drive lines 7, 8 and 9 be positioned precisely perpendicular to the plated wire 11 and hence, they may be skewed somewhat without seriously degrading the performance. The drive lines 7, 8 and 9 have a typical width dimension of approximately 20 mils and each is respectively connected to a driver circuit 10, 12 and 14. The other ends of the drive lines are connected to a terminating network 18 which may be a ground bus and hence, a complete circuit is obtained with each of the driver circuits which are also grounded.

Consider a transfer of information from position 6 to position 4. To accomplish this bit transfer, in accordance with this invention, the bit strap 9 is first energized by the driver 14 so that a current I3 flows therein. The current I3 flowing in drive line 9, produces a magnetizing force in accordance with Ampere's Law which causes the magnetization vectors located at the bit position 4 to be rotated from the easy toward the hard axis of magnetization. This rotation, which is less than 90 degrees, is shown by having vector 17 rotated to a new position represented by vector 17'. After the vector 17 has been rotated to the new position 17' and the induced voltage caused by this rotation has been allowed to die down, drive line 7 is energized by its driver circuit 10.

When drive strap 7 is energized by the driver 10, this will cause the current I1 to flow in the direction shown. The current I1 will generate a magnetizing force in a direction which will cause the vector 13 to assume a new position 13' by rotating through an angle which is less than 90 degrees from the easy axis of magnetization. The rotation of the magnetization vector 13 will cause a voltage to be induced in the plate wire 11. The polarity of the voltage induced by this rotation will cause a current I4 to flow in the plate wire 11. The polarity of this voltage is determined in the following manner.

The rotation of the magnetization vector 13 to 13' will cause a decrease of the flux in the clockwise direction (i.e., the direction along the easy axis before rotation). Therefore, the induced voltage and the current produced thereby will be in a direction that opposes the reduction of flux in the clockwise direction. The current I4 will flow upwardly, therefore, so that the flux produced by this current is clockwise or in a direction which adds flux in the direction where there was a flux decrease.

Since at the bit position 4 the vector 17 had been previously rotated to a new position 17', the current I4 will generate a magnetizing force which is in a direction to steer or rotate the vector 17' back to the position shown by the vector 17. Thus, the stable remanent state of the bit position 4 as represented by the vector 17 along the easy axis is not switched to a second stable remanent state but remains in its original first stable remanent state. In other words, if we assume that the clockwise vector orientation at bit position 6 represents a binary "zero," that information will be transferred to the bit position 4. Since the bit position 4 is already a binary "zero," the steering current I4 will simply rewrite the same information thereat. The reason that the current I4 can steer the vector 17' is that the plated wire 11 is a low impedance structure and consequently, the induced voltage caused by the rotation of vector 13 to 13' generates sufficient power to provide the above-described steering function. If it is required to further minimize the impedance of the plated wire 11, it can be obtained by converting the plated wire 11 and its return path using the principle of a co-axial structure. In other words, if the plated wire 11 is short enough its impedance will be small and sufficient power can be readily generated to accomplish information transfer. On the other hand, if the plated wire 11 is long its impedance will be too great and accordingly, the plated wire 11 is formed into a coaxial structure as shown, by way of example, in FIGURE 2. The plated wire 11 is formed into a coaxial structure by coating the outside with a thin layer of insulation such as polyethylene and then applying a coating of electroless copper after which a layer of copper is electroplated. Grooves are then formed so that the magnetic fluid generated by the current in the strap 7, 8 or 9 can penetrate to the magnetic coating.

The binary "one" represented by the counterclockwise vector 15 at the bit position 5, can similarly be transferred to the bit position 4 in the following manner. The vector 17 is again first rotated to a new position 17' by current I3 generated by the driver 14 in the drive strap 9. This current I3 generates a magnetizing force in a direction which rotates the vector 17 to an angle less than 90 degrees from the easy axis to the new position 17'. After the induced signal produced by this rotation from vector 17 to 17' has died down, the driver 12 energizes the drive strap 8. This causes the current I2 to flow in the direction shown. Current I2 causes a magnetizing force to be generated which will cause the vector 15 to be rotated to an angle less than 90° from the "easy" axis of magnetization to the position shown by vector 15'. The rotation of the vector 15 to new position 15' will cause a voltage to be induced in the plated wire 11 which is of opposite polarity to that induced by the rotation of vector 13 to 13'. This voltage causes the current I5 to flow in the direction shown.

The polarity of the voltage induced by the rotation from vector 15 to vector 15' is determined in the following manner. There is a reduction of flux in the counterclockwise direction by the rotation of vector 15 to 15'. Therefore, the current I5 is in a direction that opposes this reduction of flux. The current that will oppose a reduction of flux is in the downward direction since the flux produced by I5 will add to the flux in the counterclockwise direction (i.e., the direction where there was a decrease in flux).

The steering current I5 therefore generates a magnetizing force which causes the vector 17' to be rotated through the 90° position (i.e., the hard axis) and causes the vector 17' to assume a new position along the easy axis represented by the vector 17''. In other words, the induced voltage caused by the rotation of the magnetization vector 15 to 15' causes the stable remanent state of the bit position 4 to be switched to a new stable remanent state. It is clear therefore, that a binary "one" represented by the counterclockwise rotation of the vector 15 has been transferred to the bit position 4.

It should be apparent from the above discussion that the read-out of the memory element that supplies the steering current for the memory element which is to be switched and which is to have information transferred thereto is non-destructively read out. The reason for this is that the magnetizing force supplied by any one of the drivers 10, 12 or 14 during a memory element read-out never rotates the magnetization vectors to the 90 degree hard axis. As is well known, the hard axis is an unstable position for the magnetization vectors. Accordingly, this is non-destructively read out of the memory element. The bit driver 3 at its output contiguous to the end of the plated wire 11 is terminated in a capacitor (not shown) to ground. Accordingly, the current I4 and I5 flow through the transfer loop or plate wire 11 and complete the circuit through ground terminals provided by the terminating network 16 and the grounded capacitor. In the event that information is loaded into any one of the bit locations 4, 5 and 6 by means of the bit driver 3 and the required drivers 10, 12 and 14, the write current from the bit driver will not short to ground through the abovementioned capacitor and the current is D.C.

The fact that information can be stored in a certain location in a memory and transferred when needed or necessary demonstrates that the device described above may be utilized as a temporary register to store information until needed.

The bit driver 6 is utilized to provide steering current in conjunction with any one of drive currents I1, I2, or I3 to reset any one or all of the bits 4, 5, or 6 prior to bit transfer.

In summary therefore this invention relates to a digital memory which is adapted to transfer information along a plated wire memory element. Accordingly, a first bit location is made ready to receive new information by applying a non-destructive drive current to a word strap in the hard direction. The second bit location is then pulsed in the hard direction by sending a non-destructive current down its associated drive strap. The voltage induced in the plated wire by pulsing the second drive strap generates sufficient power to enable the information stored in the second bit location to be transferred to the first bit location. The reason that the plated wire is capable of generating sufficient steering current to transfer information from one bit to another is that the plated wire provides a power gain (that is, a sizable amount of voltage is developed at a low impedance) when there is a rotation of the magnetization vector at a particular bit position.

Obviously, many modifications of this inventoin not described herein will become apparent to those already skilled in the art from the reading of this disclosure. Therefore, it is intended that the matter contained in the foregoing description and accompanying drawings be interpreted as illustrative and not limitative, the scope of the invention being defined in the appended claims.

The embodiments of the invention in which an exclusive property or privilege is claimed are defined as follows:

1. An information transfer arrangement comprising:

(a) first and second magnetizable data storage elements, said first and second data storage elements each adapted to assume first and second stable remanent states;

(b) means linking said first and second data storage elements;

(c) means coupled to said first magnetizable data storage element to partially switch said first data storage element from said first toward said second stable remanent state by rotating its magnetization through an angle slightly less than 90 degrees;

(d) means coupled to said second magnetizable data storage element to partially switch said second data storage element from said second toward said first stable remanent state by rotating its magnetization through an angle slightly less than 90 degrees after said first data storage element has been partially switched, said partial switching of said second data storage element producing in said means linking said first and second data storage elements a signal with a polarity which causes said first data storage element to be completely switched to said second stable remanent state;

(e) said second data storage element returning to said second remanent state after it has been partially switched.

2. An information transfer arrangement comprising:

(a) a plated magnetizable wire adapted to store first and second information signals at first and second locations, respectively, along its length;

(b) means coupled to said first and second locations to transfer the information stored in said first location along said wire to said second location;

(c) said late mentioned means rotating the magnetic magnetization at said first and second locations through an angle silghtly less than 90 degrees;

(d) said information in said first location remaining thereat after being transferred.

3. An information transfer arrangement comprising:

(a) a plated magnetizable wire having the property of uniaxial anisotropy forming a preferred axis of magnetization adapted to store first and second information signals at first and second locations, respectively, along its length, said first information signal being oriented along said preferred axis in a first direction and said second information signal being oriented along said preferred axis in a second direction;

(b) means inductively coupled to said first location to rotate the magnetization vectors along its preferred axis of magnetization to an angle less than ninety degrees;

(c) means inductively coupled to said second location to rotate the magnetization vectors along its preferred axis of magnetization to an angle less than ninety degrees after said magnetization vectors of said first location are rotated, the rotation of said vectors at said second location inducing a current in said plated wire to steer the magnetization vectors of said first location to the same direction along the preferred axis as the magnetization vectors are oriented at said second location;

(d) the magnetization vectors at said second location returning to the preferred axis after it has been rotated.

4. An information transfer arrangement comprising:

(a) a plated magnetizable wire adapted to store first and second information signals at first and second locations, respectively, along its length;

(b) means inductively coupled to said first location to non-destructively read out the information stored in said first location, said read-out of information inducing a signal in said plated wire;

(c) means inductively coupled to said second location to non-destructively read out the information stored in said second location after said first location has been read out, said read-out of information inducing a second signal in plated wire, said information stored in said second location being transferred to said first location when said first and second induced signals are different.

5. An information transfer device comprising:

(a) first and second magnetizable data storage elements having identical characteristics adapted to assume first and second stable remanent states;

(b) means coupled to said first magnetizable data storage element to partially switch said first data storage element from said first toward said second stable remanent state by rotating the magnetization through an angle slightly less than 90 degrees;

(c) means coupled to said second magnetizable data storage element to partially switch said second data storage element from said second toward said first stable remanent state after said first data storage element has been switched by rotating the magnetization through an angle slightly less than 90 degrees, said partial switching of said second data storage element producing a signal with power sufficient to cause said first data storage element to be completely switched to said second stable remanent state;

(d) said second data storage element returning to its original state after being partially switched.

6. The arrangement in accordance with claim 4 wherein said plated wire comprises a 5 mil diameter substrate upon which is coated a Permalloy film having the property of uniaxial anisotropy.

7. The arrangement in accordance with claim 4 wherein said means inductively coupled to said first location comprises a conductor which is juxtaposed to said wire and is arranged substantially orthogonal thereto.

8. The arrangement in accordance with claim 4 wherein said means inductively coupled to said second location comprises a conductor which is juxtaposed to said wire and is arranged substantially orthogonal thereto.

References Cited

UNITED STATES PATENTS

| | | | |
|---|---|---|---|
| 3,417,385 | 12/1968 | Wolf | 340—174 |
| 3,068,453 | 12/1962 | Broadbent. | |
| 3,113,297 | 12/1963 | Dietrich. | |
| 3,248,713 | 4/1966 | Middelhock. | |
| 3,357,000 | 12/1967 | Tickle. | |

STANLEY M. URYNOWICZ, Jr., Primary Examiner